US012628082B2

(12) United States Patent
Li

(10) Patent No.: US 12,628,082 B2
(45) Date of Patent: May 12, 2026

(54) INFORMATION CONFIGURATION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 308 days.

(21) Appl. No.: 18/260,650

(22) PCT Filed: Jan. 15, 2021

(86) PCT No.: PCT/CN2021/072321

§ 371 (c)(1),
(2) Date: Jul. 7, 2023

(87) PCT Pub. No.: WO2022/151436

PCT Pub. Date: Jul. 21, 2022

(65) Prior Publication Data

US 2024/0064641 A1      Feb. 22, 2024

(51) Int. Cl.
H04W 52/02      (2009.01)
H04W 68/02      (2009.01)
H04W 76/28      (2018.01)

(52) U.S. Cl.
CPC ....... H04W 52/0235 (2013.01); H04W 68/02 (2013.01); H04W 76/28 (2018.02)

(58) Field of Classification Search
CPC .... H04L 5/0048; H04L 5/0053; H04W 24/02; H04W 24/08; H04W 24/10; H04W 48/16;

H04W 52/02; H04W 52/0216; H04W 52/0219; H04W 52/0229; H04W 52/0235; H04W 68/005; H04W 68/02;

(Continued)

(56) References Cited

U.S. PATENT DOCUMENTS

2019/0150114 A1*   5/2019   Liu ....................... H04W 48/16
                                                          370/252
2020/0029302 A1    1/2020   Cox et al.
                        (Continued)

FOREIGN PATENT DOCUMENTS

CN        109196935 A     1/2019
CN        110972237 A     4/2020
                        (Continued)

OTHER PUBLICATIONS

International Search Report and Written Opinion of International Application No. PCT/CN2021/072321, dated Sep. 23, 2021, 15 pages.

(Continued)

*Primary Examiner* — Christopher Biagini
(74) *Attorney, Agent, or Firm* — Finnegan, Henderson, Farabow, Garrett & Dunner, L.L.P.

(57)      ABSTRACT

A method for information configuration is performed by a terminal, and includes: receiving configuration information sent by a network device for configuring a power-saving signal, wherein the power-saving signal is configured for the terminal to monitor a paging message in at least one of an idle state or an inactive state.

17 Claims, 6 Drawing Sheets terminal network device

S101, receiving configuration information sent by a network device for configuring a power-saving signal

(58) Field of Classification Search
CPC .......... H04W 68/025; H04W 72/0446; H04W
72/23; H04W 76/27; H04W 76/28; Y02D
30/70
See application file for complete search history.

(56) References Cited

U.S. PATENT DOCUMENTS

| | | | | |
|---|---|---|---|---|
| 2021/0014825 A1* | 1/2021 | Shi | ..................... | H04W 52/0229 |
| 2022/0104170 A1* | 3/2022 | Liberg | ................ | H04W 68/005 |
| 2022/0201649 A1* | 6/2022 | Cox | ...................... | H04W 68/02 |
| 2023/0075197 A1* | 3/2023 | Xu | ...................... | H04W 56/001 |

FOREIGN PATENT DOCUMENTS

| | | | |
|---|---|---|---|
| CN | 111328461 A | 6/2020 | |
| CN | 111869273 A | 10/2020 | |
| WO | WO 2020032532 A1 | 2/2020 | |
| WO | WO 2020165385 A1 | 8/2020 | |
| WO | WO 2021005647 A1 | 1/2021 | |
| WO | WO-2022151120 A1 * | 7/2022 | .......... H04W 68/025 |

OTHER PUBLICATIONS

Extended European Search Report issued in Application No. 21918640.0 dated Feb. 27, 2024, 13 pages.

Vivo, "Discussion on paging enhancements for idle/inactive mode UE power saving," 3GPP TSG RAN WG1#102-e, R1-2005388, e-Meeting, Aug. 17-28, 2020, 8 pages.

Xiaomi Communications, "Discussion on UE Power saving for RRC-Idle/RRC-Inactive State," 3GPP TSG-RAN WG2 Meeting #111 electronic, R2-2006729, Online, Aug. 17-28, 2020, 4 pages.

Notice of Reasons for Refusal issued by the Japanese Patent Office on May 28, 2024, in corresponding Application No. JP 2023-543041, 5 pages.

* cited by examiner

| terminal | | network device |

S101, receiving configuration information sent by a
network device for configuring a power-saving signal Apparatus for information configuration  900

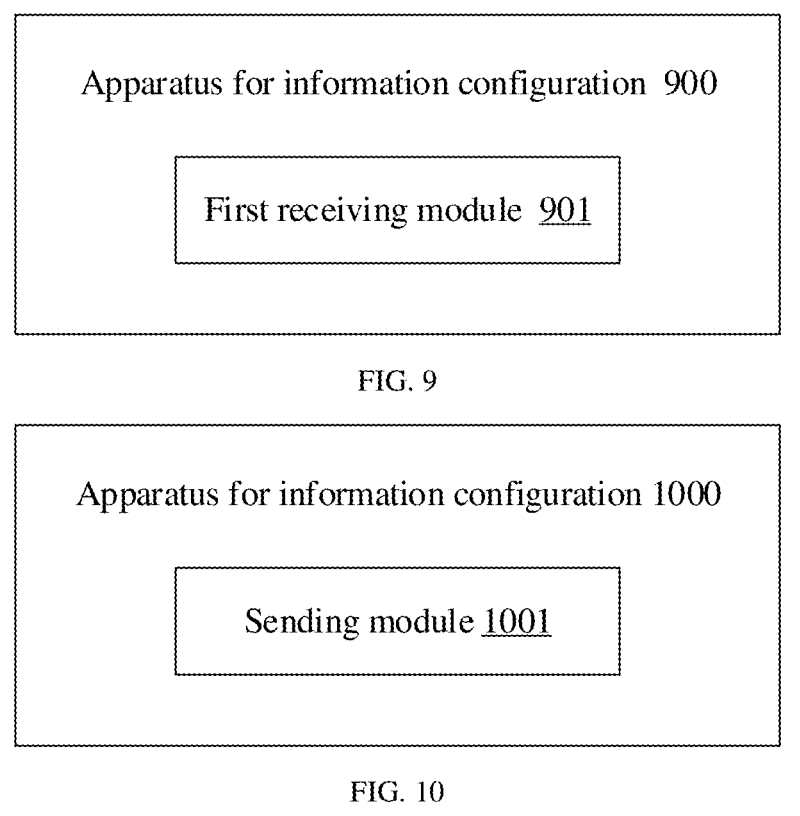

First receiving module  901

FIG. 9

Apparatus for information configuration 1000

Sending module 1001

FIG. 10

INFORMATION CONFIGURATION METHOD AND APPARATUS, AND COMMUNICATION DEVICE AND STORAGE MEDIUM

CROSS-REFERENCE TO RELATED APPLICATION

This application is the U.S. national application of International Application No. PCT/CN2021/072321, filed on Jan. 15, 2021, the entire contents of which are incorporated herein by reference.

TECHNICAL FIELD

The present disclosure relates to a field of communication technologies, and particularly to a method and an apparatus for information configuration, a communication device and a storage medium.

BACKGROUND

In a discontinuous reception (DRX) scenario, a user equipment (UE) monitors a physical downlink control channel (PDCCH) during a DRX activation period corresponding to the UE, so as to realize for the purpose of reducing power consumption.

However, for a specific type of terminal with low cost and low power consumption requirements, such as a New Radio Lite (NR-Lite) terminal, it is difficult to meet the low power consumption requirements only based on DRX mechanism, and a good power saving mechanism is also required for a state such as an idle state.

SUMMARY

According to a first aspect of the disclosure, a method for information configuration is performed by a terminal. The method includes: receiving configuration information sent by a network device for configuring a power-saving signal, in which the power-saving signal is configured for the terminal to monitor a paging message in at least one of an idle state or an inactive state.

According to a second aspect of the disclosure, a method for information configuration is performed by a base station. The method includes: sending configuration information for configuring a power-saving signal to a terminal, in which the power-saving signal is configured for the terminal to monitor a paging message in at least one of an idle state or an inactive state.

According to a third aspect of the disclosure, a communication device includes: a processor and a memory storing instructions executable by the processor. The processor is configured to receive configuration information sent by a network device for configuring a power-saving signal, in which the power-saving signal is configured for the terminal to monitor a paging message in at least one of an idle state or an inactive state.

BRIEF DESCRIPTION OF THE DRAWINGS

The accompanying drawings, which are incorporated in and constitute a part of this specification, illustrate embodiments consistent with the present disclosure and together with the description serve to explain principles of the embodiments of the present disclosure.

FIG. 9 is a block diagram illustrating an apparatus for information configuration according to an embodiment.

FIG. 10 is a block diagram illustrating an apparatus for information configuration according to an embodiment.

DETAILED DESCRIPTION

Embodiments will be described in detail, examples of which are illustrated in the accompanying drawings. When the following description refers to the accompanying drawings, the same numerals in different drawings refer to the same or similar elements unless otherwise indicated. The implementations described in the following embodiments do not represent all implementations consistent with the embodiments of the present disclosure. Rather, they are merely examples of apparatuses and methods consistent with aspects of the disclosed embodiments as recited in the appended claims.

Terms used in the embodiments of the present disclosure are used only for the purpose of describing specific embodiments, and are not intended to limit the embodiments of the present disclosure. As used in the examples of this disclosure and the appended claims, the singular forms "a/an" and "the" are also intended to include the plural unless the context clearly dictates otherwise. It should also be understood that the term "and/or" as used herein refers to and includes any combination and all possible combinations of one or more of the associated listed items.

It should be understood that although the embodiments of the present disclosure may use the terms first, second, third, etc. to describe various information, the information should not be limited to these terms. These terms are only used to distinguish information of the same type from one another. For example, without departing from the scope of the embodiments of the present disclosure, first information may also be called second information, and similarly, second information may also be called first information. Depending on the context, the words "if" and "in case of" as used herein may be interpreted as "upon" or "when" or "in response to determining".

In order to better describe any embodiment of the present disclosure, an embodiment of the present disclosure takes an application scenario of access control as an example for illustration.

Figures 1, 2:
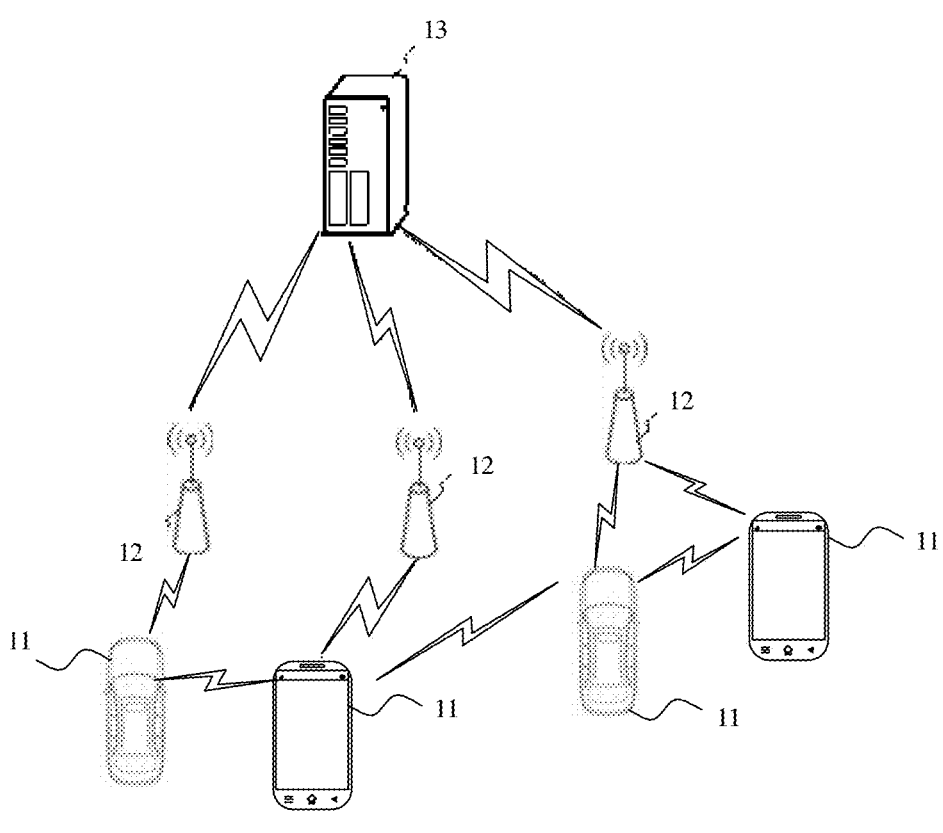
FIG. 1 is a schematic diagram illustrating a wireless communication system according to an embodiment.
FIG. 2 is a flowchart illustrating a method for information configuration according to an embodiment.

FIG. 1 is a schematic diagram illustrating a wireless communication system according to an embodiment. As shown in FIG. 1, the wireless communication system is a communication system based on cellular mobile communication technology, and the wireless communication system may include: several terminals 11 and several base stations 12.

The terminal 11 may be a device that provides voice and/or data connectivity to a user. The terminal 11 may communicate with one or more core networks via a radio access network (RAN), and the terminal 11 may be an Internet of Things terminal, such as a sensor device, a mobile phone (or called a "cellular" phone) and a computer having an IoT terminal. For example, the terminal 11 may be a fixed, portable, pocket, hand-held, built-in computer or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment. Alternatively, the terminal 11 may also be a device of an unmanned aerial vehicle. Alternatively, the terminal 11 may also be a vehicle-mounted device, for example, a trip computer with a wireless communication function, or a wireless terminal connected externally to the trip computer. Alternatively, the terminal 11 may also be a roadside device, for example, it may be a street lamp, a signal lamp, or other roadside devices with a wireless communication function.

The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G. The access network in the 5G system may be called a new generation-radio access network (NG-RAN).

The base station 12 may be an evolved base station (eNB) used in the 4G system. Alternatively, the base station 12 may also be a base station (gNB) that adopts a centralized distributed architecture in a 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the terminal 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the terminals 11, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

As shown in FIG. 2, the embodiment of the present disclosure provides a method for information configuration, which is applied to a terminal. The method includes the following step.

At S101, configuration information sent by a network device for configuring a power-saving signal is received. The power-saving signal is configured for the terminal to monitor a paging message in an idle state and/or an inactive state.

In the embodiments of the present disclosure, the terminal may include a predetermined type of terminal with high requirements on low power consumption, for example, a device with low manufacturing cost, low complexity, low power consumption, and enhanced coverage to a certain extent (such as, 5G NR-Lite terminals and IoT devices, etc.).

The network device may be a base station or a core network. The terminal receives the configuration information sent by the network device, and monitors the paging message based on the configuration of the power-saving signal in the configuration information.

Here, the configuration information is used to configure the power-saving signal. The power-saving signal is used for the terminal to monitor whether and when to monitor paging in the idle state and the inactive state. For example, the terminal detects a power-saving signal. When the power-saving signal is detected, the terminal monitors the paging message in the next monitoring period. When the power-saving signal is not detected, the terminal skips the next monitoring period and does not monitor the paging message.

For another example, when the power-saving signal is detected, the terminal may monitor the paging message in the next N monitoring periods. When the power-saving signal is not detected before a (N+1)th paging period, the terminal may skip the paging period and does not monitor the paging message.

In this way, the terminal may selectively monitor the paging based on the power-saving signal, thus reducing unnecessary monitoring and achieving the purpose of reducing power consumption.

In some embodiments, the terminal is a reduced-capability user equipment (Redcap UE) or an enhanced mobile broadband (eMBB) UE.

Here, the Redcap UE is a reduced-capability terminal, shorted as NR-Lite. That is to say, power saving of the Redcap UE in the idle state and the inactive state is very important. Therefore, for this type of terminal, the paging message may be monitored based on the above configuration information of the power-saving signal.

The eMBB UE is an enhanced device that optimizes data rate, low latency, high capacity and coverage, and has the characteristics of low power consumption and high reliability at the same time. Also, the eMBB UE has high requirements for power saving in the idle state and the inactive state.

Figure 3:
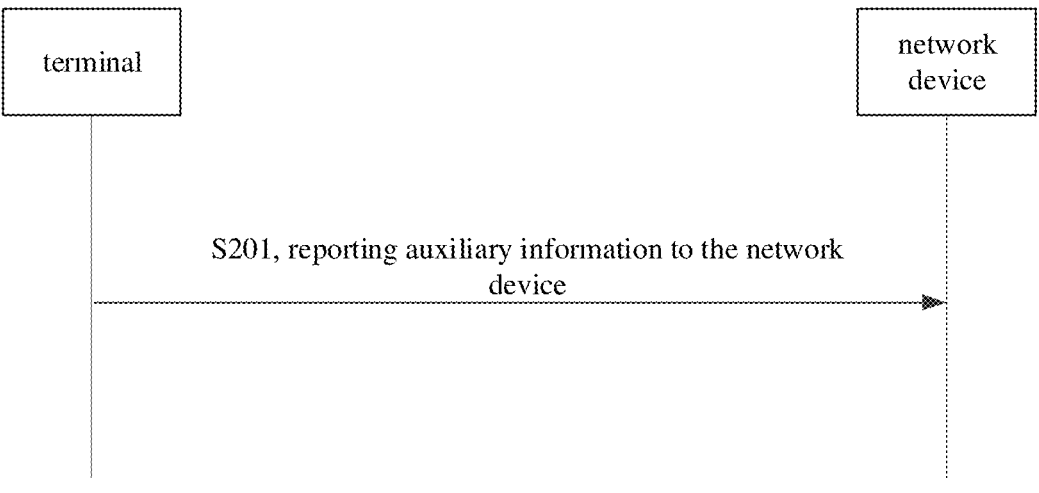
FIG. 3 is a flowchart illustrating a method for information configuration according to an embodiment.

An embodiment of the present disclosure provides a method for information configuration, as shown in FIG. 3, the method includes the following step.

At S201, auxiliary information is reported to the network device. The auxiliary information is configured for the network device to determine the configuration information.

In the embodiment of the present disclosure, the terminal reports auxiliary information to the network device so that the network device configures the power-saving signal, and the network device may send configuration information according to auxiliary information reported by different terminals.

The auxiliary information may be used to indicate the capability of a terminal, so that the network device may perform respective configuration according to the capabilities of the terminals, which reduces performance degradation in power saving caused by configuration information that does not conform to the capability of the terminal.

In some embodiments, the auxiliary information includes at least one of: information indicating whether the Redcap UE or the eMBB UE supports using the power-saving signal to monitor the paging message under discontinuous reception (DRX) or extended discontinuous reception (eDRX); or information indicating a minimum offset value between a power-saving signal supported by the Redcap UE or the eMBB UE and a paging occasion (PO).

Here, the terminal may or may not support the detection of a power-saving signal under DRX or eDRX. Therefore, when the auxiliary information reported by the terminal includes information supporting the detection of a power-saving signal, the network device may configure a power-saving signal for the terminal; and when the terminal does not support the detection of the power-saving signal, the network device does not need to perform configuration for the terminal.

The terminal may also report a value range or several optional values of a minimum offset value between a power-saving signal supported by the terminal itself and the PO. In this way, the network device may configure a corresponding power-saving signal based on the auxiliary information reported by the terminal, so that the power-saving signal configured by the network device meets the conditions that the terminal may perform detection.

In addition, the minimum offset value between the power-saving signal supported by the terminal and the PO may be related to a type of the terminal, so that the network device may perform configuration accordingly for the current type of terminal according to parameters corresponding to different types of terminals predetermined. That is, it is only necessary to know the type of the terminal, and there is no need to obtain the capability value of each terminal.

In some embodiments, it is a required function that the Redcap UE supports using the power-saving signal to monitor the paging message under the DRX or eDRX.

In the embodiment of the present disclosure, considering that the Redcap UE has high requirements on power saving performance, it may be specified as a required function that the Redcap UE supports using the power-saving signal to monitor the paging message under DRX or eDRX.

That is to say, the Redcap UE has a function of using the power-saving signal to monitor the paging message under DRX or eDRX. In this way, the network device does not need to determine whether the Redcap UE supports the detection of the power-saving signal, but may directly configure the power-saving signal. That is to say, the Redcap UE may not report its own auxiliary information to the network device to inform the network device of its own capability value. In this case, the network device only needs to know the type of the terminal is the Redcap UE, may thus determine the corresponding configuration and send the corresponding configuration information.

In some embodiments, the auxiliary information further includes: indicating a first minimum offset value between the power-saving signal supported by the Redcap UE and the PO; and/or indicating a second minimum offset value between the power-saving signal supported by the eMBB UE and the PO, in which the first minimum offset value is greater than or equal to the second minimum offset value.

The auxiliary information reported by the Redcap UE and the eMBB UE may include the minimum offset value in different ranges representing terminal detection capabilities, or may include the minimum offset value in the same range. However, since the capability of the Redcap UE is weak, the first minimum offset value supported by the Redcap UE is not less than the second minimum offset value supported by the eMBB UE.

In some embodiments, reporting the auxiliary information to the network device includes: reporting the auxiliary information to the base station by using a radio paging message.

In the embodiment of the present disclosure, the terminal may carry the auxiliary information in the UE capability information and report it to the base station.

When the auxiliary information needs to be reported to a core network, the auxiliary information may be reported through a terminal release message sent by the base station to the core network; or the auxiliary information may be reported through a terminal capability information notification message sent by the base station to the core network. The core network is used to carry the auxiliary information in a paging message and send the paging message to a radio access network (RAN).

After receiving the auxiliary information reported by the terminal, the base station may report it to the core network through a terminal release message or a terminal capability information notification message, so that the core network may send the auxiliary information to the RAN during the paging process.

In some embodiments, the configuration information includes: an offset value between the power-saving signal and the PO; in which the offset value is used by the terminal to determine location information of the power-saving signal.

In the embodiment of the present disclosure, the configuration information of the power-saving signal configured by the network is at least used to configure the offset value between the power-saving signal and the PO, so the terminal may determine a location of the power-saving signal according to the offset value in the configuration information, and wake up the terminal based on the location of the power-saving signal so as to monitor the power-saving signal and paging message.

In some embodiments, the offset value is a value corresponding to a number of synchronization signal block (SSB) periods; or the offset value is a value of a duration unit.

Here, the offset value may be a duration, including a duration with an absolute time unit (such as 1 s, 40 ms, etc.), also including a duration with a logical unit, such as 1 slot and the like.

In addition, the offset value may also include a value corresponding to the number of SSB periods, for example, a duration corresponding to N SSB periods.

An embodiment of the present disclosure provides a method for information configuration. The method includes: monitoring the paging message based on the configuration information.

Here, the configuration information is used to configure the power-saving signal, and the terminal may determine how to wake up the terminal itself to monitor the paging message based on the power-saving signal according to the configuration of the configuration information.

In this way, the terminal may reduce unnecessary monitoring of the paging, thus achieving the purpose of reducing power consumption.

In some embodiments, monitoring the paging message based on the configuration information includes: determining location information of the power-saving signal based on the configuration information; and monitoring the paging message based on the location information of the power-saving signal.

Here, the configuration information is used to configure the offset value between the power-saving signal and the paging occasion, and the terminal may determine the location of the power-saving signal based on the configuration information, and wake up the terminal to monitor the paging message based on the power-saving signal.

In this way, the terminal may wake up to monitor the paging message based on the location of the power-saving signal, thus reducing unnecessary monitoring of the paging, thus saving power consumption.

In some embodiments, the configuration information includes: at least one offset value between the power-saving signal and the PO. Determining the location information of the power-saving signal based on the configuration information includes: determining the location information of the power-saving signal based on a minimum offset value supported by the Redcap UE or the eMBB UE and an offset value configured in the configuration information.

The network device may configure one or more offset values for the terminal, so that the terminal may determine the location information of the power-saving signal based on the minimum offset value supported by its own capability.

Exemplarily, for a terminal in a DRX or eDRX scenario, the network device may correspondingly configure an offset value between the power-saving signal and the PO based on a terminal capability involved in the auxiliary information reported by the terminal. At this time, the terminal may determine the location information of the power-saving signal based on the offset value configured in the configuration information.

In addition, the network device may also configure multiple offset values for the terminal, and the terminal may determine the location information of the power-saving signal based on one of the offset values according to a range covered by its own capability.

In some embodiments, the at least one offset value includes: an offset value configured for the Redcap UE or the eMBB UE. Determining the location information of the power-saving signal based on the minimum offset value supported by the Redcap UE or the eMBB UE and the offset value configured in the configuration information, includes:

in response to the minimum offset value supported by the Redcap UE or the eMBB UE being greater than the offset value configured in the configuration information, determining the location information of the power-saving signal based on the offset value configured in the configuration information; or in response to the minimum offset value supported by the Redcap UE or the eMBB UE being greater than the offset value configured in the configuration information, monitoring the paging message; or in response to the minimum offset value supported by the Redcap UE or the eMBB UE being less than or equal to an offset value configured in the configuration information, determining the location information of the power-saving signal based on the offset value configured in the configuration information.

In the embodiment of the present disclosure, the network device may configure an offset value for a predetermined type of terminal, and the terminal determines the location of the power-saving signal based on the offset value configured by the network and the minimum offset value supported by itself.

When the minimum offset value supported by the terminal is greater than the configured offset value, the capability of the terminal does not meet the configured offset value, Thus, the terminal may not enter a deep sleep state, but falls back to a short-term monitoring period, so that the terminal may determine the location information of the power-saving signal directly based on the configured offset value.

In addition, when the minimum offset value supported by the terminal is greater than the configured offset value, the terminal may directly monitor the paging message rather than to detect the power-saving signal.

When the minimum offset value supported by the terminal is less than or equal to the configured offset value, the terminal meets the configured offset value, so the terminal may directly determine the location of the power-saving signal based on the configured offset value.

In some embodiments, in response to the minimum offset value supported by the Redcap UE or the eMBB UE being greater than the offset value configured in the configuration information, monitoring the paging message includes:

in response to the minimum offset value supported by the Redcap UE or the eMBB UE being greater than the offset value configured in the configuration information, skipping monitoring of the power-saving signal based on a protocol and monitoring the paging message.

When the minimum offset value supported by the terminal is greater than the offset value configured in the configuration information, the capability of the terminal does not meet the configured offset value, so it is difficult to monitor the power-saving signal. Therefore, the monitoring of the power-saving signal may be skipped based on the protocol, and the paging message may be directly monitored.

In this way, for a terminal with insufficient capability, further power saving is not performed, while for a terminal with strong capability, the configuration information of the power-saving signal may be used to perform a power saving monitoring operation.

In some embodiments, the at least one offset value includes:

a common offset value configured for the Redcap UE and the eMBB UE; or an offset value configured for the Redcap UE and an offset value configured for the eMBB UE independently.

In the embodiment of the present disclosure, different offset values may be independently configured for the Redcap UE and the eMBB UE, or the same offset value may be shared. Exemplarily, an offset value is configured for the Redcap UE within a value range of the minimum offset value reported by the Redcap UE, and an offset value is configured for the eMBB UE within a value range of the minimum offset value reported by the eMBB UE. For another example, a common offset value is configured for the Redcap UE and the eMBB UE within the value range of the minimum offset value reported by the Redcap UE and the value range of the minimum offset value reported by the eMBB UE.

In some embodiments, the at least one offset value includes: an offset value configured for the Redcap UE or at least one offset value configured for the eMBB UE; and determining the location information of the power-saving signal based on the minimum offset value supported by the Redcap UE or the eMBB UE and the offset value configured in the configuration information, includes:

in response to the minimum offset value supported by the Redcap UE being less than or equal to the offset value configured for the Redcap UE, determining the location information of the power-saving signal based on the offset value; or in response to the minimum offset value supported by the Redcap UE being greater than the offset value configured for the Redcap UE, determining the location information of the power-saving signal based on an offset value configured for the eMBB UE to which the Redcap UE falls back.

In the embodiment of the present disclosure, when the minimum offset value supported by the Redcap UE is less than or equal to the configured offset value, then the configured offset value covers the capability of the Redcap UE, so the Redcap UE may determine the location information of the power-saving signal based on the configured offset value.

However, when the minimum offset value supported by the Redcap UE is greater than the configured offset value, the Redcap UE has a weak capability and may thus fall back to the offset value corresponding to the eMBB UE, i.e., a fallback value. The fallback value may be an eDRX short offset value or an eDRX long offset value configured by the base station for the eMBB UE.

In some embodiments, the at least one offset value includes: a short offset value and a long offset value configured for the Redcap UE, in which the short offset value is less than or equal to the long offset value; and determining the location information of the power-saving signal based on the minimum offset value supported by the Redcap UE and the offset value configured in the configuration information includes:

in response to the minimum offset value supported by the Redcap UE being less than or equal to the short offset value, determining the location information of the power-saving signal based on the short offset value; or in response to the minimum offset value supported by the Redcap UE being less than or equal to the long offset value, determining the location information of the power-saving signal based on the long offset value; or in response to the minimum offset value supported by the Redcap UE being greater than the long offset value, determining the location information of the power-saving signal based on the long offset value and/or the short offset value.

In the embodiment of the present disclosure, the configuration information may include two offset values configured for the terminal, including a long offset value and a short offset value.

When the minimum offset value supported by the Redcap UE is less than or equal to the short offset value, the capability of the terminal is strong. Therefore, the configured short offset value and long offset value may cover the capability value of the terminal. Therefore, the terminal may determine the location of the power-saving signal based on the configuration value, and then monitor the paging message based on the power-saving signal.

In the case of using the long offset value, when the minimum offset value supported by the Redcap UE is less than or equal to the long offset value, the capability of the terminal conforms to the configuration of the long offset value, and the terminal may determine the location of the power-saving signal based on the configured long offset value, and monitor the paging message.

When the minimum offset value supported by the Redcap UE is greater than the long offset value, the capability of the terminal is weak, and the configured offset value cannot cover the capability value of the terminal. Therefore, the terminal may not perform a deep sleep at this time, but monitor a power-saving signal corresponding to the long offset value and/or the short offset value, and monitor the paging message based on the power-saving signal.

In some embodiments, determining the location information of the power-saving signal based on the minimum offset value supported by the Redcap UE and the offset value configured in the configuration information includes:

determining an offset value matching the minimum offset value supported by the Redcap UE from at least one offset value configured in the configuration information, and determining the location information of the power-saving signal according to the matched offset value.

In the embodiment of the present disclosure, the offset value matched by the configuration information may be in one-to-one correspondence with the capability value of the terminal, that is, the minimum offset value supported by the terminal. In this way, the terminal may determine according to different offset values, the location information of the power-saving signal based on the corresponding matching value.

Figure 4:
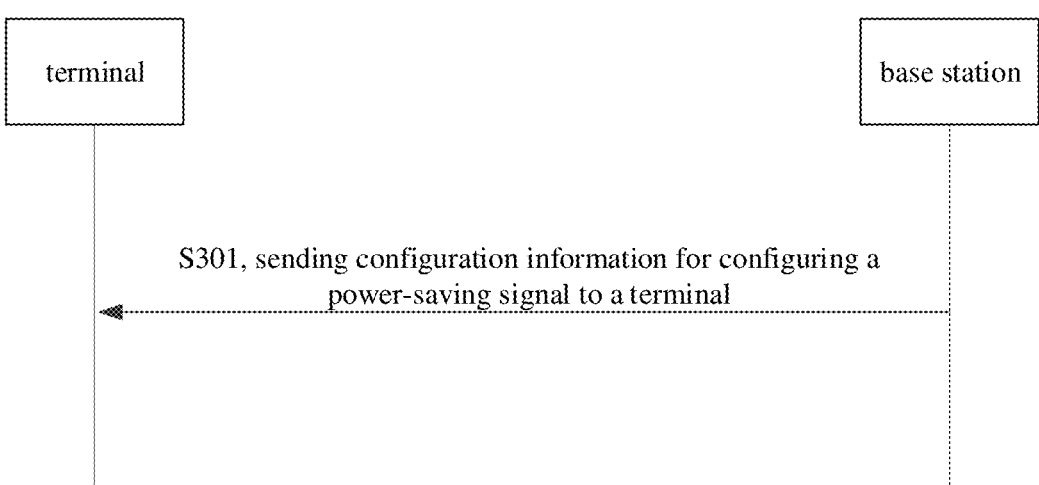
FIG. 4 is a flowchart illustrating a method for information configuration according to an embodiment.

As shown in FIG. 4, an embodiment of the present disclosure provides a method for information configuration, which is applied to a base station. The method includes the following step.

At S301, configuration information for configuring a power-saving signal is sent to the terminal, in which the power-saving signal is configured for the terminal to monitor a paging message in an idle state and/or an inactive state.

In the embodiment of the present disclosure, a predetermined type of terminal may include a terminal with high requirements on low power consumption, for example, a device with low manufacturing cost, low complexity, low power consumption and enhanced coverage to a certain extent (such as, 5G NR-Lite terminals and IoT devices, etc.).

The base station sends the configuration information to the terminal, and the terminal may monitor the paging message based on configuration of a power-saving signal in the configuration information.

Here, the configuration information is used to configure the power-saving signal. The power-saving signal is used for the terminal to determine whether and when to monitor paging in the idle state and the inactive state. For example, the terminal detects a power-saving signal. When the power-saving signal is detected, the terminal monitors the paging message in the next monitoring period. When the power-saving signal is not detected, the terminal skips the next monitoring period and does not monitor the paging message.

For another example, when the power-saving signal is detected, the terminal may monitor the paging message in the next N monitoring periods. When the power-saving signal is not detected before a (N+1)th paging period, the terminal may skip the paging period and does not monitor the paging message.

In this way, by configuring the power-saving signal for the terminal, the terminal may selectively monitor the paging based on the power-saving signal, thus reducing unnecessary monitoring and achieving the purpose of reducing power consumption.

In some embodiments, the terminal is a reduced-capability user equipment (Redcap UE) or an enhanced mobile broadband (eMBB) UE.

Here, the Redcap UE is a reduced-capability terminal, shorted as NR-Lite. That is to say, power saving of the Redcap UE in the idle state and the inactive state is very important. Therefore, for this type of terminal, the paging message may be monitored based on the above configuration information of the power-saving signal.

The eMBB UE is an enhanced device that optimizes data rate, low latency, high capacity and coverage, and has the characteristics of low power consumption and high reliability at the same time. Also, the eMBB UE has high requirements for power saving in the idle state and the inactive state.

In some embodiments, the method also includes: receiving auxiliary information reported by the Redcap UE or the eMBB UE; and sending the configuration information for configuring the power-saving signal to the Redcap UE or the eMBB UE includes:

sending the configuration information to the Redcap UE or the eMBB UE based on the auxiliary information.

In the embodiment of the present disclosure, the base station receives the auxiliary information reported by the terminal for configuring the power-saving signal, so that the configuration information may be sent based on the auxiliary information reported by different terminals.

The auxiliary information may be used to indicate the capability of a terminal, and the base station performs corresponding configuration based on the capability of the terminal, so as to reduce performance degradation in power saving caused by configuration information that does not conform to the capability of the terminal.

In some embodiments, the auxiliary information includes at least one of: information indicating whether the Redcap UE or the eMBB UE supports using the power-saving signal to monitor the paging message under discontinuous reception (DRX) or extended discontinuous reception (eDRX); or information indicating a minimum offset value between a power-saving signal supported by the terminal and a paging occasion (PO).

Here, the terminal may or may not support the detection of a power-saving signal under DRX or eDRX. Therefore, when the auxiliary information reported by the terminal includes information supporting the detection of a power-saving signal, the network device may configure a power-saving signal for the terminal; and when the terminal does not support the detection of the power-saving signal, the network device does not need to perform configuration for the terminal.

The terminal may also report a value range or several optional values of a minimum offset value between a power-saving signal supported by the terminal itself and the PO. In this way, the network device may configure a corresponding power-saving signal based on the auxiliary information reported by the terminal, so that the power-saving signal configured by the network device meets the conditions that the terminal may perform detection.

In addition, the minimum offset value between the power-saving signal supported by the terminal and the PO may be related to a type of a terminal, so that the network device may perform configuration accordingly for the current type of terminal according to parameters corresponding to different types of terminals predetermined. That is, it is only necessary to know the type of the terminal, and there is no need to obtain the capability value of each terminal.

In some embodiments, it is a required function that the Redcap UE supports using the power-saving signal to monitor the paging message under the DRX or eDRX.

In the embodiment of the present disclosure, considering that the Redcap UE has high requirements on power saving performance, it may be specified as a required function that the Redcap UE supports using the power-saving signal to monitor the paging message under DRX or eDRX.

In this way, the network device does not need to determine whether the Redcap UE supports the detection of the power-saving signal, but may directly configure the power-saving signal. That is to say, the Redcap UE may not report its own auxiliary information to the network device to inform the network device of its own capability value. In this case, the network device only needs to know the type of the terminal is the Redcap UE, may thus determine the corresponding configuration and send the corresponding configuration information.

In some embodiments, the auxiliary information further includes: indicating a first minimum offset value between the power-saving signal supported by the Redcap UE and the PO; and/or indicating a second minimum offset value between the power-saving signal supported by the eMBB UE and the PO, in which the first minimum offset value is greater than or equal to the second minimum offset value.

The auxiliary information reported by the Redcap UE and the eMBB UE may include the minimum offset value in different ranges representing terminal detection capabilities, or may include the minimum offset value in the same range. However, since the capability of the Redcap UE is weak, the first minimum offset value supported by the Redcap UE is not less than the second minimum offset value supported by the eMBB UE.

In some embodiments, receiving the auxiliary information reported by the Redcap UE or the eMBB UE includes: receiving the auxiliary information reported by the Redcap UE or the eMBB UE by using terminal capability information.

The base station receives the auxiliary information reported by the terminal, and may determine the capability of the terminal based on the auxiliary information. Based on the auxiliary information, the base station may determine the configuration information configured for the terminal, thus facilitating the terminal to determine the location of the power-saving signal based on the configuration information.

In some embodiments, the method also includes:

reporting the auxiliary information to a core network by using a terminal release message; or reporting the auxiliary information to a core network by using a UE capability information notification message, in which the core network is configured to carry the auxiliary information in a paging message and send the paging message to a radio access network (RAN).

In the embodiments of the present disclosure, the base station may report the auxiliary information reported by the terminal to the core network, and the core network may determine configuration information of the corresponding terminal. When the terminal is released, the base station may report the auxiliary information to the core network by using the terminal release message, or carry the auxiliary information in the terminal capability information notification message and report it to the core network.

When the core network receives the auxiliary information, the core network may carry the auxiliary information in the paging message and send it to the corresponding RAN, so that the base station in the corresponding RAN during the paging process may provide configure corresponding configuration information for a terminal to be paged based on the auxiliary information in the paging message.

In some embodiments, the configuration information includes: an offset value between the power-saving signal and the PO, in which the offset value is configured for the terminal to determine location information of the power-saving signal.

In the embodiment of the present disclosure, the configuration information of the power-saving signal configured by the base station is at least used to configure the offset value between the power-saving signal and the PO, so the terminal may determine a location of the power-saving signal based on the offset value in the configuration information, and wake up the terminal based on the location of the power-saving signal so as to monitor the power-saving signal and paging message.

In some embodiments, the offset value is a value corresponding to a number of synchronization signal block (SSB) periods; or the offset value is a value of a duration unit.

Here, the offset value may be a duration, including a duration with an absolute time unit (such as 1 s, 40 ms, etc.), also including a duration with a logical unit, such as 1 slot and the like.

In addition, the offset value may also include a value corresponding to the number of SSB periods, for example, a duration corresponding to N SSB periods.

In some embodiments, sending the configuration information for configuring the power-saving signal to the Redcap UE or eMBB type includes:

sending to the Redcap UE or the eMBB UE, an offset value between the power-saving signal and the PO, which corresponds to a type of the terminal.

In the embodiment of the present disclosure, the configuration information configured by the base station may correspond to the type of the terminal. Therefore, when the base station sends the configuration information, the base station may configure a corresponding offset value based on the type of the terminal. In this way, the base station may not need to receive the auxiliary information reported by the terminal, and may not know the capability of the terminal, but only configure based on the type of the terminal.

In this way, when the terminal does not report the auxiliary information, the base station may also configure the power-saving signal of the terminal accordingly.

In some embodiments, sending to the Redcap UE or the eMBB UE, the offset value between the power-saving signal and the PO and corresponding to the type of the terminal includes:

sending to the Redcap UE, an offset value in a value range of a same configuration information multiplexed with the eMBB UE; or sending to the Redcap UE, an offset value in a dedicated configuration information, in which the dedicated configuration information is different from configuration information of the eMBB UE.

In the embodiments of the present disclosure, the configuration information sent by the base station may be configuration information multiplexed with different types of terminals, or may be dedicated configuration information independently configured for different types of terminals.

For the multiplexed configuration information, the Redcap UE may use part or all of the offset values configured in the configuration information, and the eMBB UE may use part or all of the offset values configured in the configuration information. Exemplarily, for example, when the multiplexed configuration information={40 ms, 240 ms, 1 s, 2 s, 4 s}, the UE reporting capability value for the eMBB UE may be one of {40 ms, 240 ms, 1 s, 2 s} and the UE reporting capability value for the Redcap UE may only take some of the longer values, such as {1 s, 2 s, 4 s}.

For the configuration information configured separately for different types of terminals, a range for the Redcap UE corresponding to its value reported may be configured, such as the configuration information for the Redcap UE={40 ms, 240 ms, 1 s, 2 s}, and the configuration information for the eMBB UE={1 s, 2 s, 4 s}.

In some embodiments, sending the configuration information for configuring the power-saving signal to the Redcap UE or the eMBB UE includes:

sending to the Redcap UE or the eMBB UE, a mapping relationship between a power-saving signal and a PO, which corresponds to a type of the terminal.

The configuration information of the base station may be the mapping relationship between a power-saving signal and the PO, which corresponds to the type of the terminal. For example, a 1:N mapping relationship is configured for the Redcap UE, and a 1:1 mapping relationship is configured for the eMBB UE. In this way, the terminal may determine the corresponding mapping relationship based on its own type, and determine the location of the power-saving signal based on the mapping relationship.

In some embodiments, sending the configuration information for configuring the power-saving signal to the Redcap UE or the eMBB UE includes:

sending a power offset value between a power-saving signal and a reference symbol to the terminal, which corresponds to the terminal type.

Here, the reference symbol may include a SSB or a channel state information reference signal (CSI-RS) and the like.

Exemplarily, the Redcap UE uses a higher power offset of powerBoost for the power-saving signal than the eMBB UE.

Embodiments of the present disclosure also provide the following examples.

The power-saving signal is introduced in the power-saving project of 5G NR, in which a wake-up signal (WUS) is a low-power detection signal. When the UE detects the WUS, it means that the UE needs to monitor the PDCCH, and when the UE does not detect the WUS, the UE skips the monitoring of the PDCCH. In a scenario where the DRX is configured, the WUS may be configured before the DRX onduration and if the UE does not detect the WUS, the whole onduration needs to be skipped. The frequentness at which the power-saving signal WUS skips the onduration may be 1 or an integer greater than 1. That is, every one or more DRX cycles corresponds to one power-saving signal.

Figure 5:
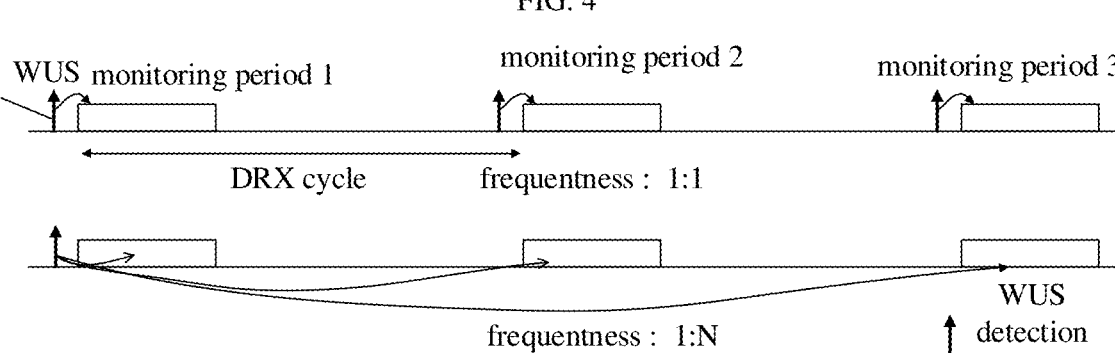
FIG. 5 is a diagram illustrating a relationship between a power-saving signal and a DRX cycle according to an embodiment.

As shown in FIG. 5, for the frequentness N (that is, a corresponding ratio of the power-saving signal to the DRX cycle is 1:N) compared with the frequentness 1, signaling overhead may be saved but a great delay may also be caused. In addition, there may be an improvement of the 1:N mapping relationship. For example, when a power-saving signal is received, N DRX durations are continuously monitored; but when no power-saving signal is received, only one DRX duration is skipped, etc. This method is more suitable for services with strict delay requirements.

The terminal monitoring the power-saving signal includes the following keypoints.

The WUS configuration provided in the system information includes a time offset between the first PO among the plurality of POs and an end moment of WUS. The UE listens to these POs and uses the time offset to calculate a start time of a subframe.

1. For a scenario where the DRX is configured, the UE may be informed of the above time offset value through a signal;

2. For a scenario where the eDRX is configured, if the eDRX long offset value (timeoffset-eDRX-Long) is not broadcast, the UE may be informed of the eDRX short offset value (timeoffset-eDRX-Short);

3. For a scenario where the eDRX is configured, it is determined as shown in the following Table 1 whether to broadcast the long offset value:

TABLE 1

Determining the offset value between WUS and PO

| | | eDRX long offset value | |
|---|---|---|---|
| | | 1000 ms | 2000 ms |
| The minimum offset reported by the UE | 40 ms or none | eDRX short offset value | eDRX short offset value |
| | 240 ms | eDRX long offset value | eDRX short offset value |
| | 1000 ms | eDRX long offset value | eDRX long offset value |
| | 2000 ms | eDRX short offset value | eDRX long offset value |

The time offset here is used to determine the actual subframe g0, that is, g0=PO−time offset, where the PO is a paging occasion of the subframe.

For the UE using eDRX, when WUS occurs within the paging time window, the same time offset is applied between the end moment of WUX and the first PO.

In the power saving project, for the connected state, the terminal needs to report the following auxiliary information to the network for determining the configuration of the power-saving signal:

1. Whether the UE supports a power-saving signal;

2. The start and end time configuration of the power-saving signal may be a time offset relative to a certain reference point, such as an offset value relative to the DRX onduration.

The offset supported by the UE may be specified in the following Table 2.

TABLE 2

| Offset supported by UE | | |
|---|---|---|
| | The minimum offset/slots | |
| SCS/kHz | The first value | The second value |
| 15 | 1 | 3 |
| 30 | 1 | 6 |
| 60 | 1 | 12 |
| 120 | 2 | 24 |

Indications of the two offset values are given in the Table 2, respectively.

When power saving in the idle state and/or inactive state is considered, the WUS may also be configured before the PO. At this time, the offset value between the WUS and the PO needs to satisfy the Automatic Gain Control (AGC) as well as real-time frequency domain resource synchronization between the terminal and the network. Therefore, the connected state is not necessarily applicable to the idle state, so the methods according to the embodiments of the present disclosure may be used.

For the Reduced Capacity UE, it is referred to as NR-Lite or Redcap UE for short. This type of device is similar to an IoT device in LTE. Based on the requirements in 5G NR-lite, it needs to meet:

1. Low cost and low complexity;

2. Enhanced coverage to a certain extent;

3. Power saving.

For the Redcap UE, power saving in the idle state and/or inactive state is very important, and the power-saving signal mechanism may be utilized. Therefore, it is necessary to define a process for using power-saving signals in an idle state and/or an inactive state for the Redcap UE.

In an embodiment of the present disclosure, the following method for configuring a power-saving signal is provided.

1. The network device configures configuration information of a power-saving signal for a specific type of terminal, and the terminal monitors a paging message in an idle state and/or an inactive state based on the configuration information. The specific type of terminal may be a terminal with low power consumption requirements, such as an eMBB UE, a Redcap UE, and the like.

2. The network device may determine the configuration information of the power-saving signal by using auxiliary information provided by the terminal for the network.

3. The terminal may provide the following auxiliary information (1)-(3) for the network device:

(1) Whether the terminal supports the power-saving signal under the DRX or eDRX. Whether the terminal supports the power-saving signal may be specified in an agreement. In addition, it may be a required function that the Redcap UE supports the power-saving signal. At this time, the network device may default that this type of terminal must support the power-saving signal. Therefore, the auxiliary information provided by the terminal at this time may also be a type of the terminal.

(2) A minimum offset value between the power-saving signal supported by the terminal and the PO. The minimum offset value between the power-saving signal and the PO may be specified in an agreement. When the auxiliary information reported by the terminal includes a type of the terminal or the terminal supporting the power-saving signal, the network device may directly determine the minimum offset value supported by the terminal.

For example, the agreement specifies that the minimum offset value between the power-saving signal and PO is 40 ms for the eMBB UE; and the agreement specifies that the minimum offset value between the power-saving signal and PO is 1 s, 2 s or 4 s, etc. for the Redcap UE.

In addition, the minimum offset value between the power-saving signal and the PO in the DRX or eDRX scenario may be specified separately through the agreement. Alternatively, the minimum offset value between the power-saving signal and the PO in the DRX scenario may be specified in the agreement, and the minimum offset value in the eDRX scenario is reported by the terminal and so on.

(3) A relationship between a type of the terminal and the minimum offset value between the power-saving signal supported by the terminal the PO. Different types of terminals may define a same value range of minimum offset values, and the minimum offset value between the power-saving signal supported by the Redcap UE and the PO is not shorter than the minimum offset value supported by the eMBB UE.

In an embodiment, the same value range is defined for two types of terminals, for example={40 ms, 240 ms, 1 s, 2 s}, the UE reporting capability value for the eMBB UE may be one of {40 ms, 240 ms, is, 2 s}, and the UE reporting capability value for the Redcap UE may only take some of the longer values, such as is or 2 s.

In an embodiment, the same value range is defined for two types of terminals, for example={40 ms, 240 ms, 1 s, 2 s, 4 s}, the UE reporting capability value for the eMBB UE may be one of {40 ms, 240 ms, 1 s, 2 s}, and the UE reporting capability value for the Redcap UE may only be some of the longer values, such as {1 s, 2 s, 4 s}.

Figure 6:
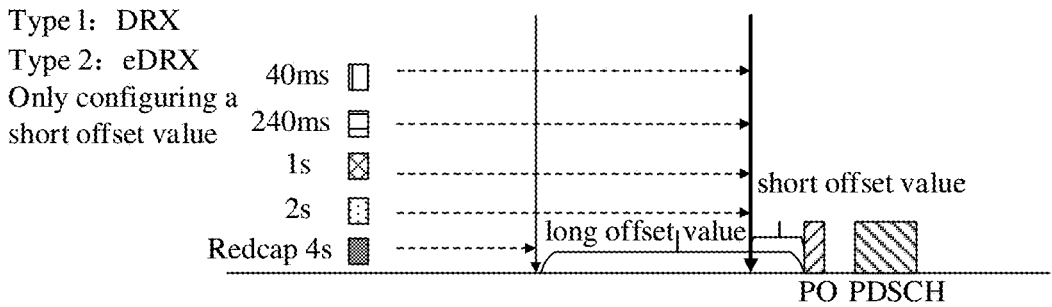
FIG. 6 is a schematic diagram illustrating a principle of monitoring POs by terminals with different capabilities based on different configuration values according to an embodiment.

In an embodiment, as shown in FIG. 6, the same value range is defined for the above two types of terminals, such as ={40 ms, 240 ms, 1 s, 2 s, 4 s}. The value corresponding to the UE reporting capability for the eMBB UE may be any one of {40 ms, 240 ms, 1 s, 2 s}. The value corresponding to the UE reporting capability for the Redcap UE may be a longer value in the value range, such as {4 s}.

In another embodiment, different value ranges are defined for two types of terminals. For example, a UE capability set for the eMBB UE is {X, Y}, and a UE capability set for the Redcap UE is {X', Y'}. As the minimum offset value between the power-saving signal supported by the Redcap UE and the PO may not be shorter than the minimum offset value between the power-saving signal supported by the eMBB UE and the PO, so X is not less than X.

Exemplarily, the auxiliary information reported by the terminal may be carried in a UE capability part in a UE radio paging message (UE-RadioPagingInfo), and reported to the base station.

4. When the terminal provides the auxiliary information to the core network, the base station may carry the auxiliary information in a UE release message and report it to the core network.

5. When the terminal provides auxiliary information to the core network, the base station may carry the auxiliary information in a UE capability information notification message (UE capacity info notification) and report it to the core network.

6. When the core network sends a paging message to the RAN, the core network may carry auxiliary information of the WUS used in the idle state and/or inactive state of the UE into the paging message and send it to the RAN, thus facilitating the configuration of the power-saving signal.

7. The base station configures configuration information of a power-saving signal for a specific type of terminal:

(1) The base station may configure an offset value between the power-saving signal and the PO, and the offset value is used for the terminal to determine a location of the power-saving signal. The offset value may be a time unit (such as ms, slot, etc.), for example, the offset value is 40 ms. In addition, the offset value may also be a value which has a corresponding relationship with the SSB period. For example, N SSB periods correspond to one power-saving signal, where the value of N may be 3 or 2 (i.e., N=3 or N=2) and so on.

(2) The base station configures the offset value between the power-saving signal and the PO for the specific type of terminal, for the terminal to determine a location of the power-saving signal.

Taking the Redcap UE as an example, a same set of configuration information of the power-saving signal having DRX/eDRX parameters is multiplexed with the eMBB UE, or a separate set of configuration information of the power-saving signal is configured.

The offset value configured for the Redcap UE is not shorter than the offset value configured for the eMBB UE. For example, the offset value configured by the base station may be a value that has a corresponding relationship with the SSB period, the offset value configured for the Redcap UE is M SSB periods, and the offset value configured for the eMBB terminal is N SSB periods, where M is greater than or equal to N.

Exemplarily, a value extension of the long offset value and the short offset value is introduced for the Redcap UE. Taking the long offset value as an example, the eMBB value is {1 s, 2 s}, which is extended to such as {1 s, 2 s, 4 s, 8 s} etc. for the Redcap UE.

(3) The mapping relationship between the power-saving signal configured by the base station for the specific type of terminal and the PO. Taking the Redcap UE as an example, a corresponding relationship value between the power-saving signal and the PO is different from that of the eMBB UE, for example, the former may take a value of 1:N, and the latter may take a value of 1:1.

(4) The base station configures a power offset of Power-Boost between the power-saving signal and a reference symbol (SSB/CSI-RS) for the specific type of terminal.

Taking the Redcap UE as an example, it uses a higher power offset of PowerBoost for the power-saving signal than the EMBB UE.

8. The terminal monitors the configured power-saving signal based on the following rules:

(1) In a scenario where only the DRX/eDRX is configured, the terminal determines the location of the power-saving signal based on an offset value between the power-saving signal configured by the network and the PO.

When a value reported by the terminal is greater than a value X configured by the base station (this means that the capability of the terminal is weak and the terminal cannot wake up monitoring subsequent POs within the value range configured by the base station), the behavior of the terminal may monitor the power-saving signal based on the configured value of the base station or may not monitor the power-saving signal.

The foregoing monitoring behavior may be notified by the base station to the terminal in advance or specified in an agreement.

For the above scenario, when the terminal does not monitor the power-saving signal, whether to continue to monitor the subsequent POs can be notified in advance by the base station or specified in the agreement.

For the specific type of terminal, such as the Redcap UE, it may be agreed in advance that the terminal will not monitor the power-saving signal, but directly monitor at the subsequent POs.

In the embodiments of the present disclosure, the offset values configured by the base station may be configured for different types of terminals respectively.

For example, the first DRX offset value is configured for the eMBB UE in the DRX mode and the second DRX offset value is configured for the Redcap UE in the DRX mode. The first eDRX short offset is configured for the eMBB UE in the eDRX mode and the second eDRX short offset value is configured for the Redcap UE in the eDRX mode.

(2) In the eDRX scenario, the specific type of terminal determines the location of the power-saving signal based on the offset value between one power-saving signal configured by the network and the PO. The working mechanism is as follows:

As shown in FIG. 6, the eMBB UE determines the location of the power-saving signal based on the offset values (short offset value, long offset value) between one or two power-saving signals configured by the network and the PO. For the specific type of terminal, such as the Redcap UE, only one offset value is configured, such as an eDRX short offset value, the value of which may be several values selected from the reporting capability values of the specific terminal Exemplarily, when the values reported by the Redcap UE are 3 s and 4 s, the configured eDRX short offset value takes the set {3 s, 4} or its subset {4 s}.

Figure 7:
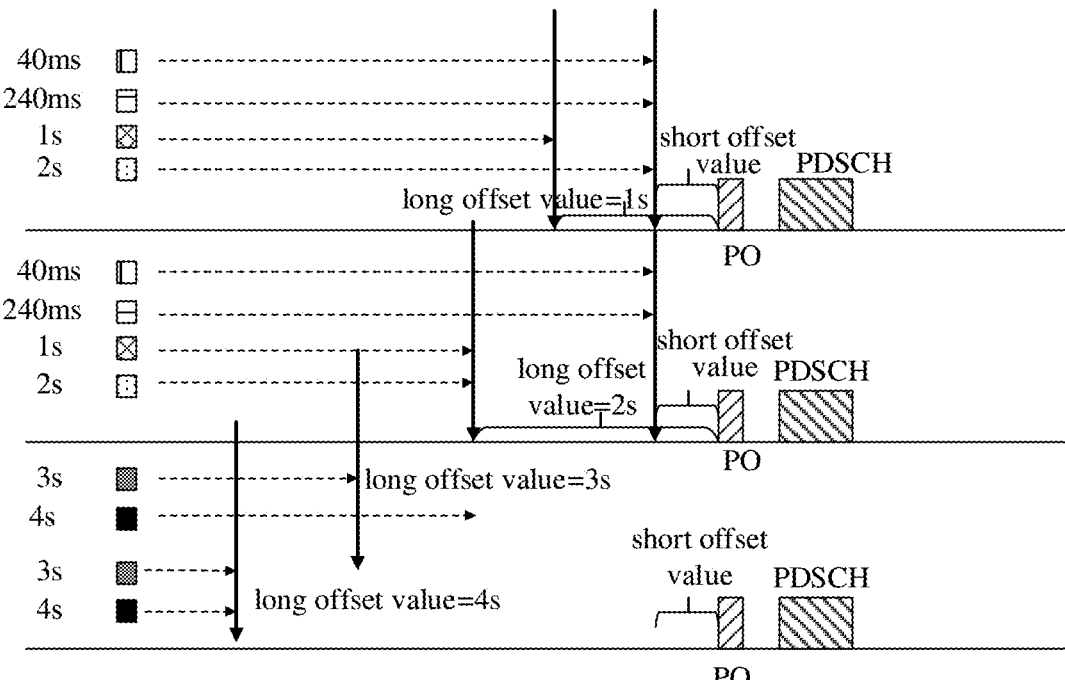
FIG. 7 is a schematic diagram illustrating a principle of monitoring POs by terminals with different capabilities based on different configuration values according to an embodiment.

In an embodiment, as shown in FIG. 7, the eDRX short offset value configured by the base station is greater than or equal to reporting capabilities of all Redcap UEs. That is, the base station performs configuration based on the maximum capability, and all the Redcap UEs may be covered at this time. Thus, the terminal follows the configuration value of the base station, that is, the 4 s Configuration in FIG. 7. In addition, the agreement defines that the offset value configured by the base station for the Redcap UE can have only one value, that is, the maximum reporting capability value.

In an embodiment, the eDRX short offset value configured by the base station is not greater than or equal to reporting capabilities of all the Redcap UEs. That is, the base station may cover the Redcap UEs with stronger capabilities at this time, and the eDRX short offset value configured by the network is used. For the terminals with weaker capabilities, fallback is performed based on the configuration value of the base station. The fallback value may be the eDRX short offset value or eDRX long offset value configured by the base station for the eMBB UE, or the power-saving signal is not monitored, as shown in 3 s Configuration of FIG. 7.

(3) In the eDRX scenario, the specific type of terminal determines the location of the power-saving signal based on the offset values (short offset value, long offset value) between the two power-saving signals configured by the network and the PO. Exemplarily, a mechanism similar to that used by the eMBB UE, for the Redcap UE, the short offset value cannot support Redcap UEs with weak capabilities, so the terminal falls back based on the configuration value of the base station, that is, falls back to the long offset value. The short offset value is not greater than the long offset value.

It should be noted that the above short offset value may include one or more candidate values. The long offset value may also include one or more candidate values.

Exemplarily, as shown in the following Table 3, the short offset value is 4 s, and the long offset value is 6 s. For a terminal with a reporting capability being 3 s or 4 s, the power-saving signal may be monitored based on the short offset value; for a terminal that cannot support the short offset value, such as the terminal with a reporting value being 6 s or 8 s, when the configured long offset value cannot be supported, the power-saving signal is monitored by falling back to the short offset value;

For a case where the long offset value is 8 s, the terminal with the reporting value being 6 s or 8 s may monitor the power-saving signal based on the long offset value.

TABLE 3

Determining the offset value between WUS and PO

| | eDRX long offset value | |
| | 6000 ms | 8000 ms |
| --- | --- | --- |
| The minimum offset reported by the UE | 3 s eDRX short offset value | eDRX short offset value |
| | 4 s eDRX short offset value | eDRX short offset value |
| | 6 s eDRX long offset value | eDRX long offset value |
| | 8 s eDRX short offset value | eDRX long offset value |

Figure 8:
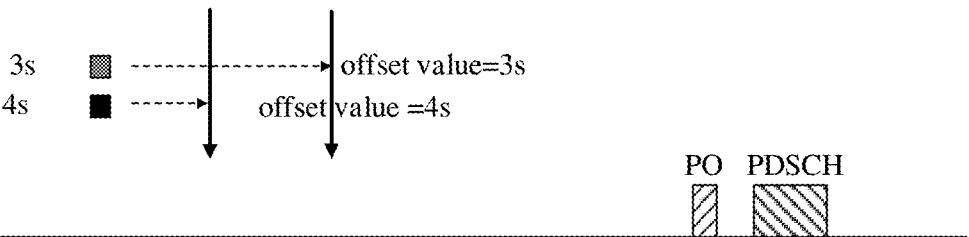
FIG. 8 is a schematic diagram illustrating a principle of monitoring POs by terminals with different capabilities based on different configuration values according to an embodiment.

(4) In the eDRX scenario, the specific type of terminal determines the location of the power-saving signal based on the offset values between the N power-saving signals configured by the network and the PO, where the N offset values correspond to the N reporting capability values, that is, an offset value is configured for each reporting capability value, exemplarily as shown in the case N=2 of FIG. 8.

As shown in FIG. 9, the embodiment of the present disclosure also provides an apparatus for information configuration 900, which is applied to a predetermined type of terminal. The apparatus includes a first receiving module 901.

The first receiving module 901 is configured to receive configuration information sent by a network device for configuring a power-saving signal, in which the power-saving signal is configured for the terminal to monitor a paging message in an idle state and/or an inactive state.

In some embodiments, the terminal is a reduced-capability user equipment (Redcap UE) or an enhanced mobile broadband (eMBB) UE.

In some embodiments, the apparatus further includes: a first reporting module, configured to report auxiliary information to the network device, in which the auxiliary information is configured for the network device to determine the configuration information.

In some embodiments, the auxiliary information includes at least one of: information indicating whether the Redcap UE or the eMBB UE supports using the power-saving signal to monitor the paging message under discontinuous reception (DRX) or extended discontinuous reception (eDRX); or information indicating a minimum offset value between a power-saving signal supported by the Redcap UE or the eMBB UE and a paging occasion (PO).

In some embodiments, it is a required function that the Redcap UE supports using the power-saving signal to monitor the paging message under the DRX or eDRX.

In some embodiments, the auxiliary information further includes: indicating a first minimum offset value between the power-saving signal supported by the Redcap UE and the PO; and/or indicating a second minimum offset value between the power-saving signal supported by the eMBB UE and the PO, in which the first minimum offset value is greater than or equal to the second minimum offset value.

In some embodiments, the first reporting module includes at least one of:

a first reporting submodule, configured to report the auxiliary information to the base station by using UE capability information;

a second reporting submodule, configured to report the auxiliary information by using a terminal release message sent by the base station to a core network; and a third reporting submodule, configured to report the auxiliary information by using a UE capability information notification message sent by the base station to the core network, in which the core network is configured to carry the auxiliary information in a paging message and send the paging message to a radio access network (RAN).

In some embodiments, the configuration information includes: an offset value between the power-saving signal and the PO, in which the offset value is configured for the terminal to determine location information of the power-saving signal.

In some embodiments, the offset value is a value corresponding to a number of synchronization signal block (SSB) periods; or the offset value is a value of a duration unit.

In some embodiments, the apparatus further includes: a monitoring module, configured to monitor the paging message based on the configuration information.

In some embodiments, the monitoring module includes:

a first determination submodule, configured to determine location information of the power-saving signal based on the configuration information; and a first monitoring submodule, configured to monitor the paging message based on the location information of the power-saving signal.

In some embodiments, the terminal is one under the DRX or eDRX scenario, and the configuration information includes: at least one offset value between the power-saving signal and the PO. The first determination submodule is configured to: determine the location information of the power-saving signal based on a minimum offset value supported by the Redcap UE or the eMBB UE and an offset value configured in the configuration information.

In some embodiments, the at least one offset value includes: an offset value configured for the Redcap UE or the eMBB UE. The first determination submodule includes:

a second determination submodule, configured to in response to the minimum offset value supported by the Redcap UE or the eMBB UE being greater than the offset value configured in the configuration information, determine the location information of the power-saving signal based on the offset value configured in the configuration information; or a second monitoring submodule, configured to in response to the minimum offset value supported by the Redcap UE or the eMBB UE being greater than the offset value configured in the configuration information, monitor the paging message; or a third determination submodule, configured to in response to the minimum offset value supported by the Redcap UE or the eMBB UE being less than or equal to an offset value configured in the configuration information, determine the location information of the power-saving signal based on the offset value configured in the configuration information.

In some embodiments, the second monitoring submodule includes:

a third monitoring submodule, configured to in response to the minimum offset value supported by the Redcap UE or the eMBB UE being greater than the offset value configured in the configuration information, skip monitoring of the power-saving signal based on a protocol and monitoring the paging message.

In some embodiments, the at least one offset value includes:

a common offset value configured for the Redcap UE and the eMBB UE; or an offset value configured for the Redcap UE and an offset value configured for the eMBB UE independently.

In some embodiments, the at least one offset value includes: an offset value configured for the Redcap UE or at least one offset value configured for the eMBB UE.

The first determination submodule includes:

a fourth determination submodule, configured to in response to the minimum offset value supported by the Redcap UE being less than or equal to the offset value configured for the Redcap UE, determine the location information of the power-saving signal based on the offset value; or a fifth determination submodule, configured to in response to the minimum offset value supported by the Redcap UE being greater than the offset value configured for the Redcap UE, determine the location information of the power-saving signal based on an offset value configured for the eMBB UE to which the Redcap UE falls back.

In some embodiments, the at least one offset value includes: a short offset value and a long offset value configured for the Redcap UE, in which the short offset value is less than or equal to the long offset value.

The first determination submodule includes:

a sixth determination submodule, configured to in response to the minimum offset value supported by the Redcap UE being less than or equal to the short offset value, determine the location information of the power-saving signal based on the short offset value; or a seventh determination submodule, configured to in response to the minimum offset value supported by the Redcap UE being less than or equal to the long offset value, determine the location information of the power-saving signal based on the long offset value; or an eighth determination submodule, configured to in response to the minimum offset value supported by the Redcap UE being greater than the long offset value, determine the location information of the power-saving signal based on the long offset value and/or the short offset value.

In some embodiments, the first determination submodule includes:

a ninth determination submodule, configured to select an offset value matching the minimum offset value supported by the Redcap UE from at least one offset value configured in the configuration information, and determine the location information of the power-saving signal according to the matched offset value.

As shown in FIG. 10, an embodiment of the present disclosure also provides an apparatus 1000 for information configuration, which is applied to a base station. The apparatus includes a sending module 1001.

The sending module 1001 is configured to send configuration information for configuring a power-saving signal to a predetermined type of terminal, in which the power-saving signal is configured for the terminal to monitor a paging message in an idle state and/or an inactive state.

In some embodiments, the terminal is a reduced-capability user equipment (Redcap UE) or an enhanced mobile broadband (eMBB) UE.

In some embodiments, the apparatus further includes: a second receiving module, configured to receive auxiliary information reported by the Redcap UE or eMBB UE.

The sending module includes: a sending submodule, configured to send the configuration information to the terminal based on the auxiliary information.

In some embodiments, the auxiliary information includes at least one of: information indicating whether the Redcap UE or the eMBB UE supports using the power-saving signal to monitor the paging message under discontinuous reception (DRX) or extended discontinuous reception (eDRX); or information indicating a minimum offset value between a power-saving signal supported by the Redcap UE or the eMBB UE and a paging occasion (PO).

In some embodiments, it is a required function that the Redcap UE supports using the power-saving signal to monitor the paging message under the DRX or eDRX.

In some embodiments, the auxiliary information further includes: indicating a first minimum offset value between the power-saving signal supported by the Redcap UE and the PO; and/or indicating a second minimum offset value between the power-saving signal supported by the eMBB UE and the PO, in which the first minimum offset value is greater than or equal to the second minimum offset value.

In some embodiments, the second receiving module includes: a first receiving submodule, configured to receive auxiliary information reported by the Redcap UE and the eMBB UE by using UE capability information.

In some embodiments, the apparatus further includes:

a second reporting module, configured to report the auxiliary information to a core network by using a terminal release message; or a third reporting module, configured to report the auxiliary information to the core network by using a UE capability information notification message, in which the core network is configured to carry the auxiliary information in a paging message and send the paging message to a radio access network (RAN).

In some embodiments, the configuration information includes: an offset value between the power-saving signal and the PO, in which the offset value is configured for the terminal to determine location information of the power-saving signal.

In some embodiments, the offset value is a value corresponding to a number of synchronization signal block (SSB) periods; or the offset value is a value of a duration unit.

In some embodiments, the sending module includes: a second sending submodule, configured to send to the terminal, an offset value between the power-saving signal and the PO and corresponding to a type of the terminal.

In some embodiments, the sending module includes:

a third sending submodule, configured to send to the Redcap UE, an offset value in a value range of a same configuration information multiplexed with the eMBB UE; or a fourth sending submodule, configured to send to the Redcap UE, an offset value in a dedicated configuration information, in which the dedicated configuration information is different from configuration information of the eMBB UE.

In some embodiments, the sending module includes: a fifth sending submodule, configured to send to the Redcap UE or the eMBB UE, a mapping relationship between a power-saving signal and a PO and corresponding to a type of the terminal.

In some embodiments, the sending module includes: a sixth sending submodule, configured to send to the Redcap UE or the eMBB UE, a power offset value between a power-saving signal and a reference symbol and corresponding to a type of the terminal.

Regarding the apparatuses in the foregoing embodiments, the specific manner in which each module executes operations has been described in detail in the embodiments related to the method, which will not be described in detail here.

Figure 11:
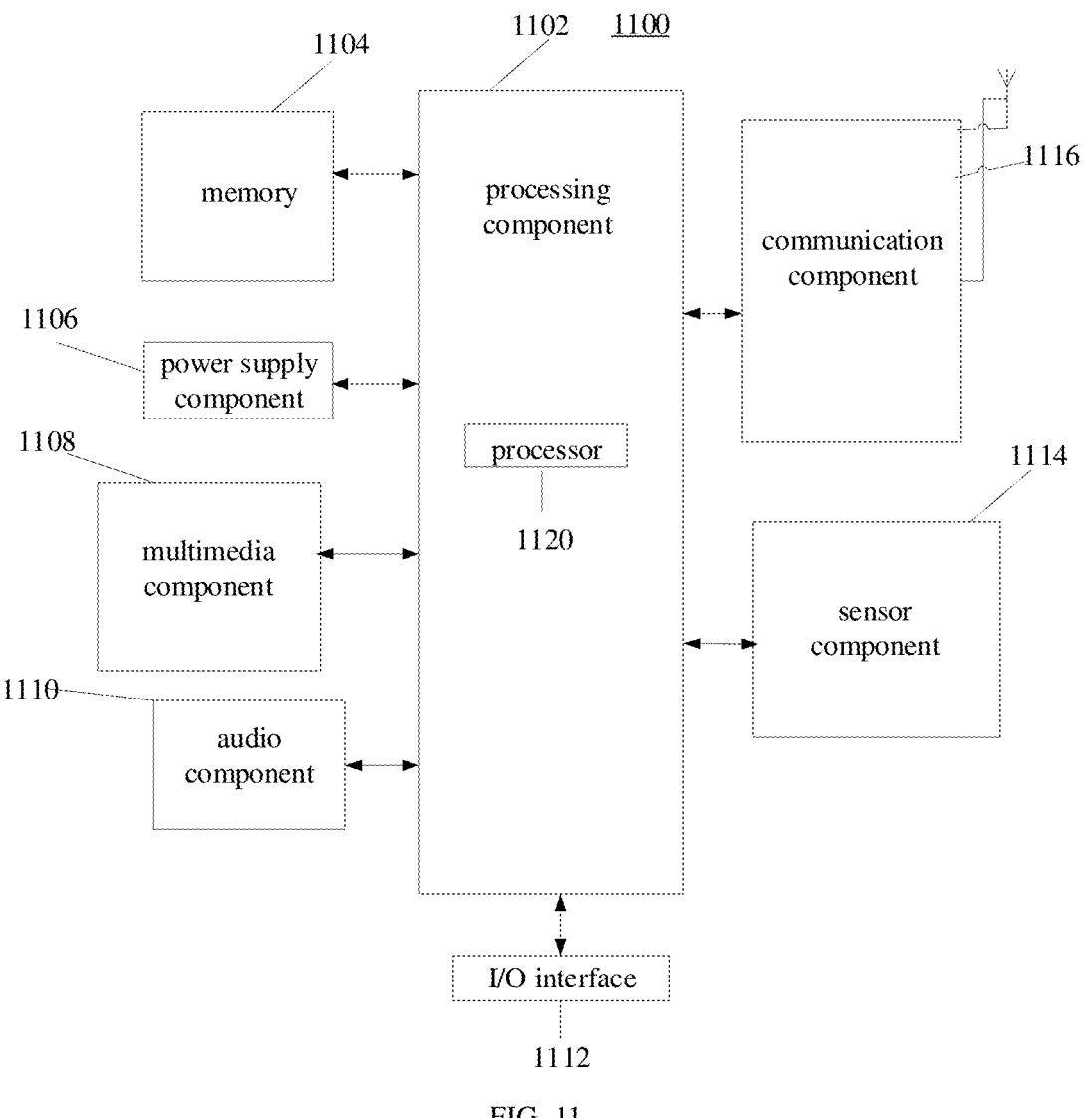
FIG. 11 is a schematic diagram illustrating a communication device according to an embodiment.

FIG. 11 is a block diagram illustrating a communication device according to an embodiment of the disclosure. The communication device may be at terminal. For example, the communication device 1100 may be a mobile phone, a computer, a digital broadcast terminal, a messaging device, a game console, a tablet device, a medical device, a fitness device, a personal digital assistant, and the like.

Referring to FIG. 11, the communication device 1100 may include one or more of the following components: a processing component 1102, a memory 1104, a power supply component 1106, a multimedia component 1108, an audio component 1110, an input/output (I/O) interface 1112, a sensor component 1114, and a communication component 1116.

The processing component 1102 generally controls overall operations of the communication device 1100, such as those associated with display, telephone calls, data communications, camera operations, and recording operations. The processing component 1102 may include at least one processor 1120 to execute instructions, so as to complete all or part of the steps of the above method. Additionally, the processing component 1102 may include one or more modules that facilitate interactions between the processing component 1102 and other components. For example, the processing component 1102 may include a multimedia module to facilitate interactions between the multimedia component 1108 and the processing component 1102.

The memory 1104 is configured to store various types of data to support operations at the communication device 1100. Examples of such data include instructions for any application or method operating on the communication device 1100, contact data, phonebook data, messages, pictures, videos, and the like. The memory 1104 may be implemented by any type of volatile or non-volatile storage device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 1106 provides power to the various components of the communication device 1100. The power components 1106 may include a power management system, at least one power supply, and other components associated with generating, managing, and distributing power for the communication device 1100.

The multimedia component 1108 includes a screen providing an output interface between the communication device 1100 and the user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, swipes, and gestures on the touch panel. The touch sensor may not only sense a boundary of a touch or swipe action, but also detect a wake up time and a pressure associated with the touch or swipe action. In some embodiments, the multimedia component 1108 includes a front camera and/or a rear camera. When the communication device 1100 is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 1110 is configured to output and/or input audio signals. For example, the audio component 1110 includes a microphone (MIC), which is configured to receive external audio signals when the communication device 1100 is in operation modes, such as a call mode, a recording mode and a speech/voice recognition mode. The received audio signals may be further stored in the memory 1104 or sent via the communication component 1116. In some embodiments, the audio component 1110 also includes a speaker for outputting the audio signals.

The I/O interface 1112 provides an interface between the processing component 1102 and a peripheral interface module, which may be a keyboard, a click wheel, a button, and the like. These buttons may include, but are not limited to: a home button, volume buttons, a start button, and a lock button.

The sensor component/assembly 1114 includes at least one sensor for providing status assessments of various aspects of the communication device 1100. For example, the sensor component 1114 may detect an open/closed state of the communication device 1100, a relative positioning of a component, which is for example a display and a keypad of the communication device 1100. The sensor component 1114 may also detect a change in the position of the communication device 1100 or a component of the communication device 1100, a presence or absence of user contact with the communication device 1100, an orientation or acceleration/deceleration of the communication device 1100, and a temperature change of the communication device 1100. The sensor component 1114 may include a proximity sensor configured to detect a presence of nearby objects in the absence of any physical contact. The sensor component 1114 may also include light sensors, such as complementary metal oxide semiconductor (CMOS) or CCD image sensors, for use in imaging applications. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the communication device 1100 and other devices. The communication device 1100 may access wireless networks based on communication standards, such as WiFi, 2G or 3G or their combination. In an embodiment, the communication component 1116 receives broadcast signals or broadcast related information from an external broadcast management system via a broadcast channel. In an embodiment, the communication component 1116 also includes a near field communication (NFC) module to facilitate short-range communication. For example, the NFC module may be implemented based on radio frequency identification (RFID)

technology, infrared data association (IrDA) technology, ultrawide band (UWB) technology, bluetooth (BT) technology and other technologies.

In an embodiment, the communication device 1100 may be programmed by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic components for performing the method described above.

In an embodiment, there is also provided a non-transitory computer-readable storage medium including instructions, such as the memory 1104 including instructions, which may be executed by the processor 1120 of the communication device 1100 to implement the above method. For example, the non-transitory computer readable storage medium may be an ROM, a random access memory (RAM), a CD-ROM, a magnetic tape, a floppy disk, an optical data storage device, and the like.

Figure 12:
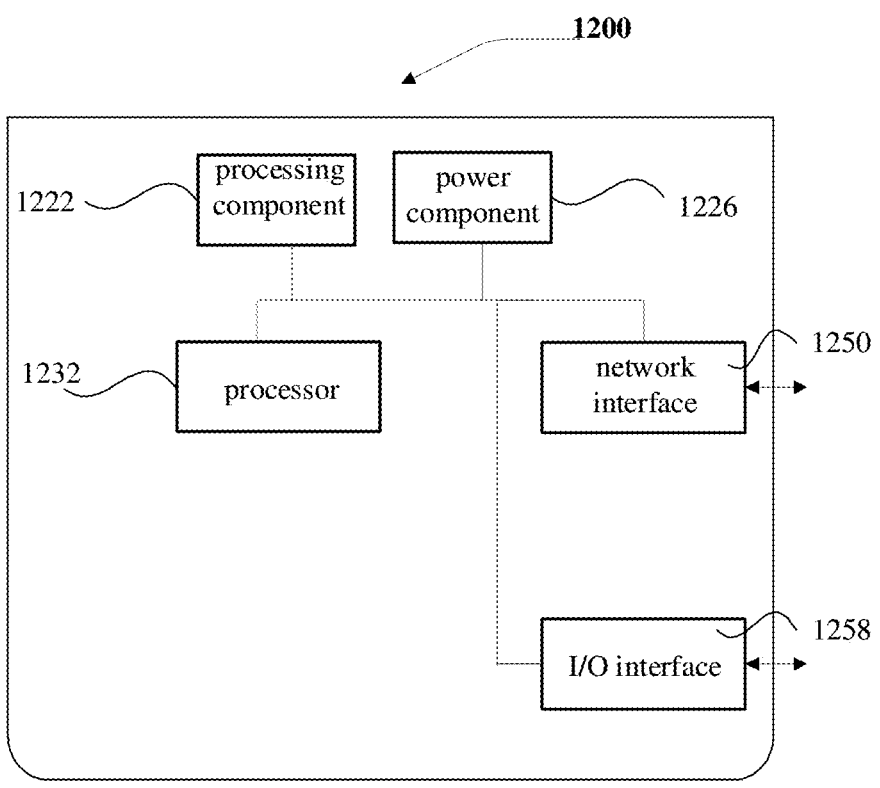
FIG. 12 is a schematic diagram illustrating a communication device according to an embodiment.

As shown in FIG. 12, an embodiment of the present disclosure shows another communication device. The communication device may be the base station involved in the embodiments of the present disclosure. The communication device 1200 may be provided as a base station. Referring to FIG. 12, the communication device 1200 includes a processing component 1222 (which further includes at least one processor), and a memory resource represented by a memory 1232 for storing instructions executable by the processing component 1222, such as application programs. The application programs stored in the memory 1232 may include one or more modules, each corresponding to a set of instructions. In addition, the processing component 1222 is configured to execute the instructions, so as to execute any method of the foregoing method applied to the communication device.

The communication device 1200 may also include a power supply component 1226 configured to perform power management of the communication device 1200, a wired or wireless network interface 1250 configured to connect the communication device 1200 to a network, and an input output (I/O) interface 1258. The communication device 1200 may operate based on an operating system stored in the memory 1232, such as Windows Server™, Mac OS X™, Unix™ Linux™, FreeBSD™ or the like.

With the method for information configuration according to the embodiments of the disclosure, through the configuration information configured by the network device for the power-saving signal, a predetermined type of terminal may monitor the paging based on the power-saving signal in an idle state and an inactive state. As such, the predetermined type of terminal in the idle state and the inactive state may dynamically monitor a paging message based on the power-saving signal, without the need for periodic monitoring, thus greatly reducing power consumption.

After considering the specification and practicing the disclosure herein, those skilled in the art may easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope of the disclosure are given by the appended claims.

It should be understood that the disclosure is not limited to the precise constructions which have been described above and shown in the drawings, and various modifications and changes may be made without departing from the scope of the disclosure. The scope of the disclosure is limited only by the appended claims.

The invention claimed is:

1. A method for information configuration, performed by a terminal, wherein the terminal is a reduced-capability user equipment (Redcap UE), the method comprising:

receiving configuration information sent by a network device for configuring a power-saving signal, wherein the power-saving signal is used by the terminal to monitor a paging message in at least one of an idle state or an inactive state; and reporting auxiliary information to the network device, wherein the auxiliary information is used by the network device to determine the configuration information, wherein the auxiliary information comprises information indicating whether the Redcap UE supports using the power-saving signal to monitor the paging message under discontinuous reception (DRX) or extended discontinuous reception (eDRX).

2. The method according to claim 1, wherein the auxiliary information further comprises:

information indicating a minimum offset value between a power-saving signal supported by the Redcap UE and a paging occasion (PO), wherein the auxiliary information indicates a first minimum offset value between the power-saving signal supported by the Redcap UE and the PO.

3. The method according to claim 1, wherein the configuration information comprises:

an offset value between the power-saving signal and a paging occasion (PO), wherein the offset value is used by the terminal to determine location information of the power-saving signal; and the offset value is one of a value corresponding to a number of synchronization signal block (SSB) periods or a value of a duration unit.

4. The method according to claim 1, further comprising:

monitoring the paging message based on the configuration information.

5. The method according to claim 4, wherein monitoring the paging message based on the configuration information comprises:

determining location information of the power-saving signal based on the configuration information; and monitoring the paging message based on the location information of the power-saving signal.

6. The method according to claim 5, wherein the configuration information comprises: at least one offset value between the power-saving signal and a paging occasion (PO);

wherein determining the location information of the power-saving signal based on the configuration information comprises:

determining the location information of the power-saving signal based on a minimum offset value supported by the Redcap UE and an offset value configured in the configuration information.

7. The method of claim 6, wherein the at least one offset value comprises:

a common offset value configured for the Redcap UE and an enhanced mobile broadband (eMBB) UE.

8. A non-transitory computer-readable storage medium having stored thereon instructions that, when executed by a processor of a terminal, cause the terminal to perform the method of claim 1.

9. A method for information configuration, performed by a base station, the method comprising:

sending configuration information for configuring a power-saving signal to a terminal, wherein the terminal is a reduced-capability user equipment (Redcap UE), wherein the power-saving signal is used by the terminal to monitor a paging message in at least one of an idle state or an inactive state, and receiving auxiliary information reported by the Redcap UE, wherein the auxiliary information comprises information indicating whether the Redcap UE supports using the power-saving signal to monitor the paging message under discontinuous reception (DRX) or extended discontinuous reception (eDRX).

10. The method according to claim 9, wherein sending the configuration information for configuring the power-saving signal to the Redcap UE comprises:

sending the configuration information to the Redcap UE based on the auxiliary information.

11. The method according to claim 10, wherein the auxiliary information further comprises:

information indicating a minimum offset value between a power-saving signal supported by the Redcap UE and a paging occasion (PO), wherein the auxiliary information further indicates a first minimum offset value between the power-saving signal supported by the Redcap UE and the PO.

12. The method according to claim 10, further comprising one of:

reporting the auxiliary information to a core network by using a terminal release message; or reporting the auxiliary information to a core network by using a UE capability information notification message, wherein the core network is configured to carry the auxiliary information in a paging message and send the paging message to a radio access network (RAN).

13. The method according to claim 9, wherein the configuration information comprises:

an offset value between the power-saving signal and a paging occasion (PO), wherein the offset value is used by the terminal to determine location information of the power-saving signal; and the offset value is one of a value corresponding to a number of synchronization signal block (SSB) periods or a value of a duration unit.

14. The method according to claim 9, wherein sending the configuration information for configuring power-saving signal to the Redcap UE comprises:

sending, to the Redcap UE, an offset value between the power-saving signal and a paging occasion (PO) and corresponding to a type of the terminal.

15. A base station, comprising:

a processor; and a memory storing instructions executable by the processor, wherein the processor is configured to perform the method of claim 9.

16. A non-transitory computer-readable storage medium having stored thereon instructions that, when executed by a processor of a base station, cause the base station to perform the method of claim 9.

17. A terminal, wherein the terminal is a reduced-capability user equipment (Redcap UE), comprising:

a processor; and a memory storing instructions executable by the processor, wherein the processor is configured to:

receive configuration information sent by a network device for configuring a power-saving signal, wherein the power-saving signal is used by the terminal to monitor a paging message in at least one of an idle state or an inactive state; and report auxiliary information to the network device, wherein the auxiliary information is used by the network device to determine the configuration information, wherein the auxiliary information comprises information indicating whether the Redcap UE supports using the power-saving signal to monitor the paging message under discontinuous reception (DRX) or extended discontinuous reception (eDRX).

\* \* \* \* \*